May 23, 1967 W. H. WELLS 3,321,206

TONE ARM REST FOR PHONOGRAPHS

Filed July 13, 1965

INVENTOR.
WILLIAM H. WELLS

By Flam and Flam
ATTORNEYS.

United States Patent Office 3,321,206
Patented May 23, 1967

3,321,206

TONE ARM REST FOR PHONOGRAPHS

William H. Wells, Woodland Hills, Calif., assignor to Newcomb Electronics Corp., Los Angeles, Calif., a corporation of California Filed July 13, 1965, Ser. No. 471,563
3 Claims. (Cl. 274—23)

ABSTRACT OF THE DISCLOSURE

Phonograph tone arm 20 is permitted to move downwardly to engage the record track. However, a bracket 38 (FIG. 2) cooperates with the under edges of the tone arm 20 to prevent the tone arm from dropping to the deck 12 and to automatically elevate the tone arm 20 should it be moved to a position beyond an angular span corresponding to alignment with the record track.

*Brief summary of invention*

This invention relates to phonographs, and particularly to a tone arm rest.

In the past, tone arm rests have been provided that are operative only adjacent the rest position of the tone arm. Yet the tone arm can be dropped in other positions with consequent damage to the needle or the record. Hence there is a need to provide a suitable restraint operative throughout the wider arc of tone arm movement.

It has also been common to provide a post that stops the angular movement of the tone arm to prevent it from being placed on the wrong side of the record.

The primary object of this invention is to provide a simple bracket that allows the tone arm to move downwardly only when the pickup is properly positioned relative to the record. For this purpose, use is made of a one piece bracket that cooperates in a unique manner with the under surfaces of the tone arm housing.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

*Detailed description*

Figure 1:
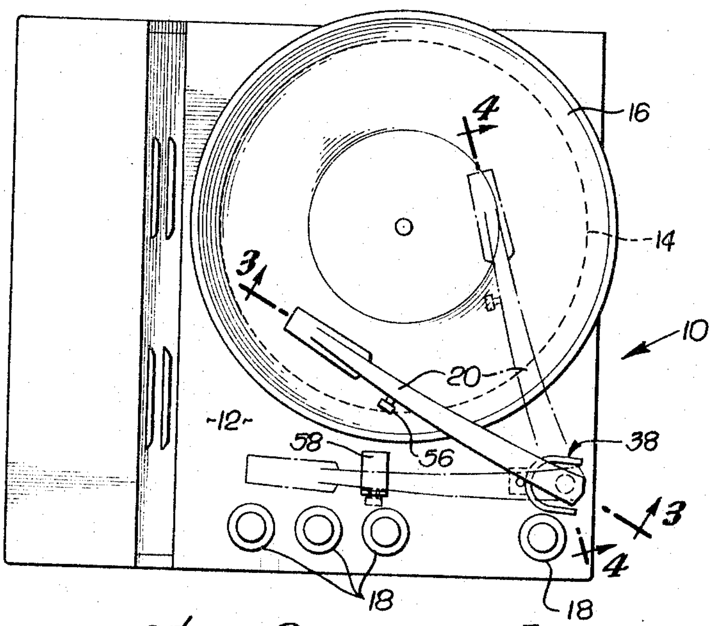
FIGURE 1 is a plan view of a portable phonograph incorporating the present invention, an alternate position of the tone arm being shown in phantom lines.

The phonograph 10 has a deck 12 above which a turntable 14 is mounted. A 12" record 16 is shown in place on the turntable. Suitable knobs 18 control the operation of the turntable and the amplifier (not shown).

A tone arm 20 of conventional design is pivotally supported in a conventional manner upon a post 22 secured to a corner of the deck 12. The tone arm 20 may be made as an aluminum casting, or as a stamping to provide a downwardly opening elongated recess. At the forward end of this recess, the pickup 24 is mounted, having a stylus or needle 26.

Figure 2:
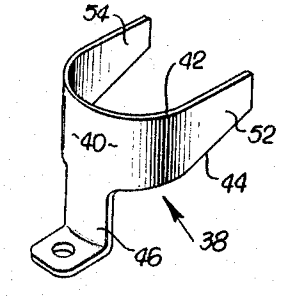
FIG. 2 is a pictorial view of a bracket forming an essential element of this invention.

The edges 28 of the tone arm are straight, except where they join a skirt 30 at the end of the tone arm. This skirt is typically provided in order effectively to shield the parts at the top of the post 22 which pivotally mount the tone arm 20. The edge 32 of the skirt joins the edge 28 on one side of the tone arm by a sloping edge 34, and by a sloping edge 36 (FIG. 5) on the other side of the tone arm. These sloping edges 34 and 36 cooperate with a bracket 38 (see also FIG. 2) in order properly to position the tone arm 20.

The bracket 38 is made as a unitary stamping from sheet stock material. It is generally U-shape in configuration, the connecting portion 40 of the U being semi-circular, and the ends being parallel tangential extensions of the semi-circular connecting portion. The bracket 38 has an upper operative edge 42 that lies in a plane. The lower edge 44 has any convenient configuration. Extending downwardly from the lower edge 44 and from the connecting portion is an angled foot 46.

By the aid of the foot 46, the bracket 38 is mounted in an accurately located position relative to the tone arm post 22 and relative to skirt 30 and edges 34 and 36. The foot 46 has its angled end inserted through a slot 48 in the deck 12. A rivet 50 (FIG. 3) fastens the bracket 38 while the ends of the slot 48 prevent the bracket from moving angularly around the rivet 50 as an axis.

Figures 3, 4, 5:
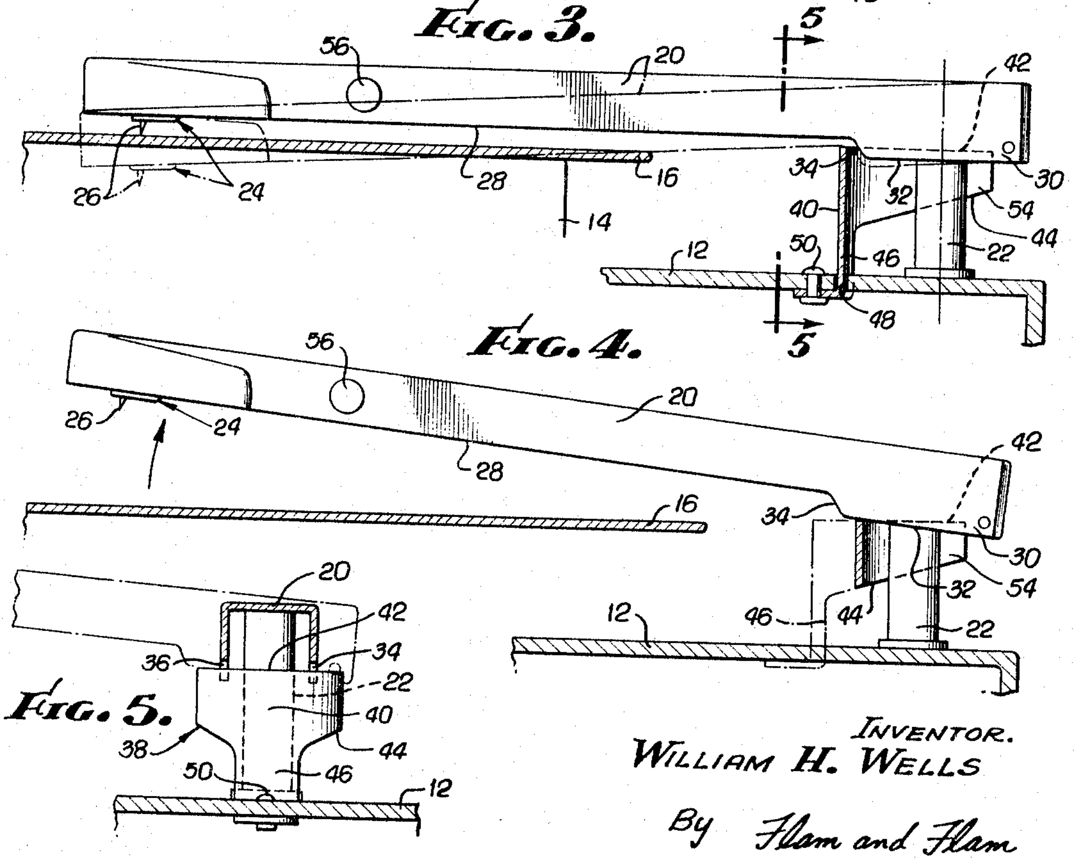
FIG. 3 is an enlarged fragmentary sectional view taken along the plane corresponding to line 3—3 of FIG. 1, an alternate position of the tone arm being shown in phantom lines.
FIG. 4 is a sectional view similar to FIG. 3, but taken along a plane corresponding to line 4—4 of FIG. 1, the tone arm being illustrated in full lines.
FIG. 5 is a fragmentary sectional view taken along the plane corresponding to line 5—5 of FIG. 3.

The bracket arms 52 and 54 extend on opposite sides of the post 22, and the plane defined by the upper edge 42 of the bracket is located just above the plane defined by the lower edge 32 of the tone arm skirt 30 when the tone arm is in the normal playing position shown in FIG. 3. But the bracket 38 is so situated that there is no interference between the surfaces throughout the arc of movement of the tone arm in its playing position.

The bracket 38 has its central connecting portion located substantially centrally beneath the tone arm 22 when the tone arm is in a rest position alongside the turntable. This rest position of the tone arm 22, as shown in FIG. 1, is determined by the engagement of a thumb screw 56 with a seat formed in a post 58 attached to the deck 12. The connecting portion 40 forwardly clears both inclined surfaces 34 and 36 at the ends of the skirt, and the edges of the skirt 32 are located within the bracket arms 52 and 54.

When the tone arm is moved to record playing position, the clearance relationship is maintained; however, the sloping edge 36 approaches the bracket edge 42 along the arm 54, and when the tone arm is moved sufficiently far, the sloping edge 36 will ride up on the bracket edge 42, tilting the tone arm upwardly as shown in FIG. 4. The tone arm is first lifted when it approaches or reaches the wrong side of the record. No positive stop is required to engage the tone arm 22.

The bracket 38 also prevents the tone arm from dropping to the deck 12 in the rest position, or if the tone arm is moved angularly beyond the rest position. In the rest position, the connecting portion 40 is positioned to engage the tone arm edge 28 forwardly of the inclined edges 34 and 36.

The inventor claims:

1. In a phonograph having a support, a turntable mounted on the support for rotation about an axis, a post, a tone arm having a skirt at one end having edges terminating at opposite sides in inclined portions, the tone arm being mounted on the post for angular movement about an axis substantially parallel to the axis of the turntable, and for limited tilting movement to lower and elevate the tone arm relative to the turntable, the combination therewith of: a unitary bracket of substantially U-shape immovably secured to the support adjacent the post, said bracket having a connecting portion and arms extending from said connecting portion, said bracket having an upper edge lying substantially entirely in a plane substantially perpendicular to said axes, said bracket edge extending with clearance about said skirt when said tone arm is in record playing position, said inclined portions riding up on said edge automatically to lift said tone arm when said tone arm is angularly moved beyond said playing position.

2. The combination as set forth in claim 1 in which said bracket has an angled foot integrally formed therewith, said foot projecting through a slot in said support, and being riveted to said support, said slot having ends preventing angular movement of the bracket about the axis of the rivet.

3. The combination as set forth in claim 1 in which said inclined portions and said bracket arms are so situated that said tone arm has a rest position in which said inclined portions are cleared, the connecting portion of said bracket forming a stop limiting downward movement of said tone arm when in said rest position by engaging said tone arm beyond said inclined portions.

No references cited.

LEONARD FORMAN, *Primary Examiner.*

H. N. HAROIAN, *Examiner.*